(12) United States Patent
Breslau et al.

(10) Patent No.: US 8,577,605 B2
(45) Date of Patent: Nov. 5, 2013

(54) VEHICLE FEEDBACK METHOD AND SYSTEM

(75) Inventors: Franklin Charles Breslau, Teaneck, NJ (US); Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 1288 days.

(21) Appl. No.: 11/874,283

(22) Filed: Oct. 18, 2007

(65) Prior Publication Data

US 2009/0105897 A1 Apr. 23, 2009

(51) Int. Cl.
*G06G 7/78* (2006.01)
*G06F 7/00* (2006.01)

(52) U.S. Cl.
USPC ............ 701/465; 701/414; 701/423; 701/424

(58) Field of Classification Search
USPC .............. 701/35–36, 49, 209, 29.1, 533, 117, 701/120, 414, 423, 424, 465
See application file for complete search history.

(56) References Cited

U.S. PATENT DOCUMENTS

| | | | | |
|---|---|---|---|---|
| 5,635,923 A | * | 6/1997 | Steele et al. | 340/905 |
| 6,198,996 B1 | * | 3/2001 | Berstis | 701/36 |
| 6,317,686 B1 | * | 11/2001 | Ran | 701/210 |
| 7,065,433 B2 | * | 6/2006 | Basu et al. | 701/29 |
| 7,685,162 B2 | * | 3/2010 | Heider et al. | 707/802 |
| 7,899,591 B2 | * | 3/2011 | Shah et al. | 701/30 |
| 2008/0249667 A1 | * | 10/2008 | Horvitz et al. | 701/1 |

OTHER PUBLICATIONS

Ecodrive—Press release; Sep. 11, 2007; http://www.fiat.com/ecodrive/press.html.*

* cited by examiner

*Primary Examiner* — Thomas Tarcza
*Assistant Examiner* — Adam Tissot
(74) *Attorney, Agent, or Firm* — Schmeiser, Olsen & Watts; William Schiesser

(57) ABSTRACT

A feedback method and system. The method includes identifying by a computing system, a user. A vehicular feedback software application is enabled for the user. A feedback software application in the computing system monitors a group of vehicle operation functions currently being executed by the user with respect to a vehicle. The feedback software application analyzes the group of vehicle operation functions with respect to a profile associated with the user. An analysis report is generated in response to the analysis. The analysis report is presented to the user. The computing system monitors a response to the first analysis report from the user.

25 Claims, 4 Drawing Sheets

VEHICLE FEEDBACK METHOD AND SYSTEM

FIELD OF THE INVENTION

The present invention relates to a method and associated system for monitoring vehicle user functions and providing feedback associated with the vehicle user functions.

BACKGROUND OF THE INVENTION

Monitoring user habits and providing recommendations with respect to transportation typically comprises an inefficient process with little flexibility. A user wishing to optimize functions associated with transportation may view reading materials that specify how to optimize the functions. The reading materials are not typically associated with the user. Accordingly, there exists a need in the art to overcome at least some of the deficiencies and limitations described herein above.

SUMMARY OF THE INVENTION

The present invention provides a feedback method comprising:
identifying, by a computing system electrically connected to a vehicle, a first user, wherein said computing system comprises a memory system, wherein said memory system comprises a first plurality of profiles and a vehicular feedback software application, and wherein said first plurality of profiles comprises data associated with various vehicle operation functions that have been previously executed by said first user;
enabling, by said computing system, said vehicular feedback software application for said first user;
retrieving, by said computing system from said memory system, a first profile of said first plurality of profiles, said first profile associated with said first user and a first group of vehicle operation functions currently being executed by said first user with respect to said vehicle;
monitoring, by said feedback software application, said first group of vehicle operation functions;
analyzing, by said feedback software application, said first group of vehicle operation functions with respect to said first profile of said first plurality of profiles;
generating in response to said analyzing said first group of vehicle operation functions with respect to said first profile of said first plurality of profiles, by said feedback software application, a first analysis report comprising results of said analyzing said first group of vehicle operation functions with respect to said first profile of said first plurality of profiles; and
presenting, by said computing system to said first user, said first analysis report
monitoring, by said computing system, a response to said first analysis report from said first user.

The present invention provides a computing system comprising a processor coupled to a computer-readable memory unit, said memory unit comprising a first plurality of profiles, a vehicular feedback software application, and instructions that when executed by the processor implement a feedback method, wherein each profile of said first plurality of profiles comprises data associated with various vehicle operation functions that have been previously executed by a first user, said method comprising:
identifying, by said computing system, said first user, wherein said computing system is electrically connected to a vehicle;
enabling, by said computing system, said vehicular feedback software application for said first user;
retrieving, by said computing system from said memory system, a first profile of said first plurality of profiles, said first profile associated with said first user and a first group of vehicle operation functions currently being executed by said first user with respect to said vehicle;
monitoring, by said feedback software application, said first group of vehicle operation functions;
analyzing, by said feedback software application, said first group of vehicle operation functions with respect to said first profile of said first plurality of profiles;
generating in response to said analyzing said first group of vehicle operation functions with respect to said first profile of said first plurality of profiles, by said feedback software application, a first analysis report comprising results of said analyzing said first group of vehicle operation functions with respect to said first profile of said first plurality of profiles; and
presenting, by said computing system to said first user, said first analysis report
monitoring, by said computing system, a response to said first analysis report from said first user.

The present invention provides a computer program product, comprising a computer readable medium comprising a computer readable program code embodied therein, said computer readable program code adapted to implement a feedback method within a computing system, said method comprising:
identifying, by said computing system, a first user, wherein said computing system is electrically connected to a vehicle, wherein said computer readable medium comprises a first plurality of profiles and a vehicular feedback software application, and wherein said first plurality of profiles comprises data associated with various vehicle operation functions that have been previously executed by said first user;
enabling, by said computing system, said vehicular feedback software application for said first user;
retrieving, by said computing system from said memory system, a first profile of said first plurality of profiles, said first profile associated with said first user and a first group of vehicle operation functions currently being executed by said first user with respect to said vehicle;
monitoring, by said feedback software application, said first group of vehicle operation functions;
analyzing, by said feedback software application, said first group of vehicle operation functions with respect to said first profile of said first plurality of profiles;
generating in response to said analyzing said first group of vehicle operation functions with respect to said first profile of said first plurality of profiles, by said feedback software application, a first analysis report comprising results of said analyzing said first group of vehicle operation functions with respect to said first profile of said first plurality of profiles; and
presenting, by said computing system to said first user, said first analysis report
monitoring, by said computing system, a response to said first analysis report from said first user.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a feedback method, said method comprising:
identifying, by said computing system, a first user, wherein said computing system is electrically connected to a vehicle, wherein said computing system comprises a memory system, wherein said memory system comprises a first plurality of profiles and a vehicular feedback software application, and wherein said first plurality of profiles comprises data associated with various vehicle operation functions that have been previously executed by said first user;

enabling, by said computing system, said vehicular feedback software application for said first user;

retrieving, by said computing system from said memory system, a first profile of said first plurality of profiles, said first profile associated with said first user and a first group of vehicle operation functions currently being executed by said first user with respect to said vehicle;

monitoring, by said feedback software application, said first group of vehicle operation functions;

analyzing, by said feedback software application, said first group of vehicle operation functions with respect to said first profile of said first plurality of profiles;

generating in response to said analyzing said first group of vehicle operation functions with respect to said first profile of said first plurality of profiles, by said feedback software application, a first analysis report comprising results of said analyzing said first group of vehicle operation functions with respect to said first profile of said first plurality of profiles; and presenting, by said computing system to said first user, said first analysis report monitoring, by said computing system, a response to said first analysis report from said first user.

The present invention advantageously provides a simple method and associated system capable of monitoring user habits and providing recommendations with respect to transportation.

DETAILED DESCRIPTION OF THE INVENTION

Figure 1:
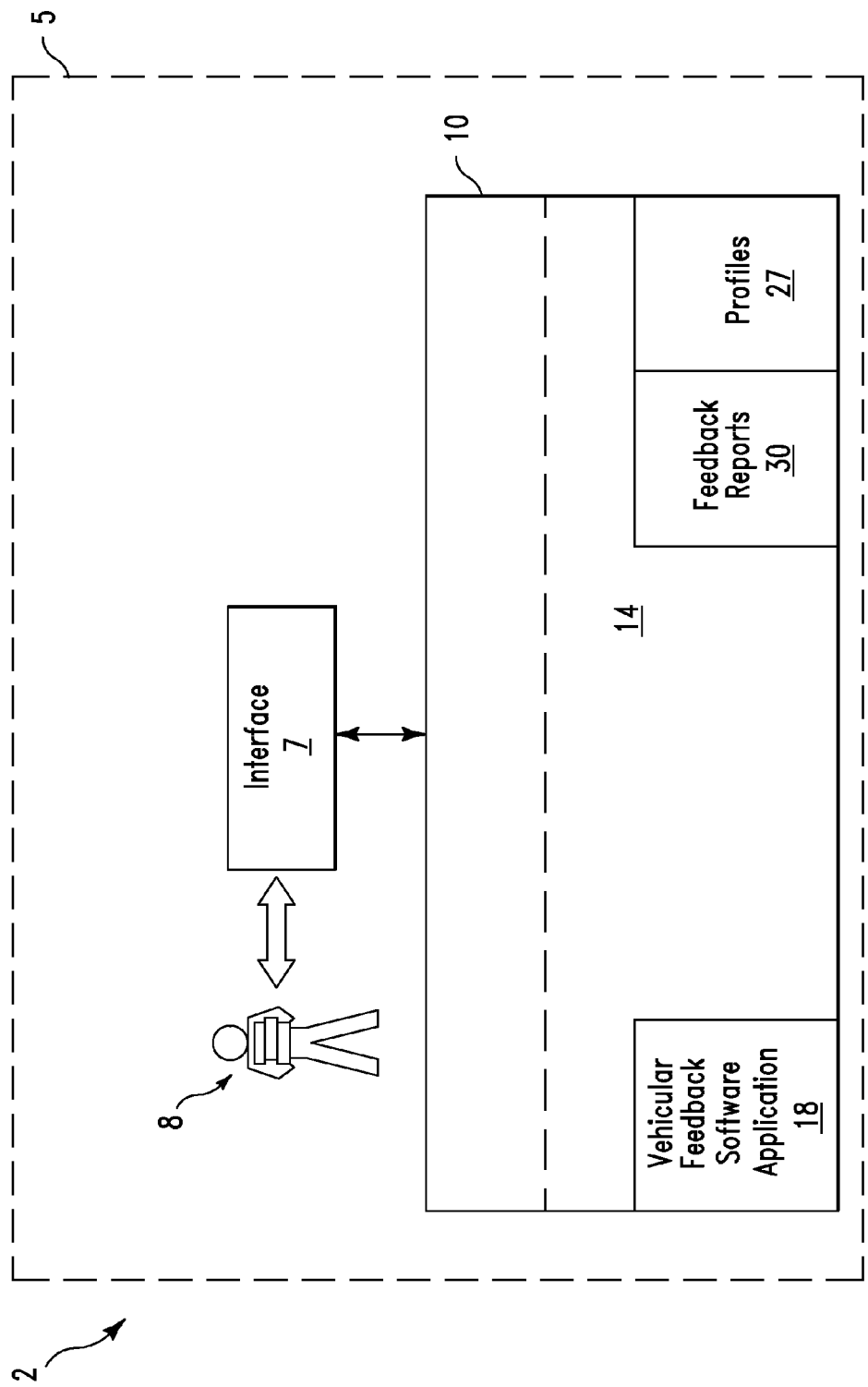
FIG. 1 illustrates a feedback system for monitoring vehicle operation functions for a user and providing feedback associated with the vehicle operation functions, in accordance with embodiments of the present invention.

FIG. 1 illustrates a feedback system 2 for monitoring vehicle operation functions for a user 8 and providing feedback associated with the vehicle operation functions, in accordance with embodiments of the present invention. User 8 performs the vehicle operation functions with respect to a vehicle 5. The vehicle 5 may be any type of vehicle that is used to transport users including, inter alia, an automobile, a boat, a train, an airplane, a motorcycle, etc. The vehicle operation functions may include functions such as, inter alia, acceleration functions (e.g., an acceleration rate), brake functions (e.g., a braking rate), time differences between an acceleration rate and a braking rate, tailgating, ventilation system usage (e.g., use of heat, air conditioning, etc), excessive speed, turn signal usage, fuel usage, erratic driving behavior, etc. The feedback (e.g., a feedback report) may comprise suggestions or recommendations for user 8 to perform the vehicle operation functions in order to increase fuel efficiency, operator efficiency, operator performance, and reduce vehicle wear.

Upon entering and powering up vehicle 5, an identity for user 8 is established based on a key or RFID device. As vehicle 5 is operated, information is gathered (e.g., an acceleration rate, a braking rate, a time differences between acceleration rate and braking rate, etc. In response to the information is gathered, system 2 generates feedback information (e.g., a feedback report) comprising suggestions or recommendations such as, inter alia, unnecessary acceleration, not decreasing a speed quickly enough when an obstruction or red light is sensed, excessive lane changing, ventilation system usage, turn signal usage, etc. When operating vehicle 5 over long distances, calculations may be generated based on user 8 available fuel stops in order to recommend when and where vehicle 5 could be refueled. System 2 could be used over a preset driving range so that user 8 may gauge his/her efficiency versus a hypothetical optimum in terms of acceleration, coasting, braking, and recommendations made on how an individual profile could be improved. Additionally, a current profile could be compared to a past profile(s) or another user's profile(s).

System 2 of FIG. 1 comprises automobile 5, computing system 10, and user interface 7 connected to a computing system 10. Although computing system 10 in FIG. 1 is located internal to automobile 5, note that computing system 10 could be located external to computing system 10 (e.g., in a remote location). Computing system 10 may comprise any type of computing system including, inter alia, a personal computer (PC), a server computer, a database computer, an embedded computer, etc. Computing system 10 comprises a memory apparatus 14. Memory apparatus 14 comprises vehicular feedback software application 18, profiles 27, and feedback reports 30. Although FIG. 1 illustrates memory apparatus 14 located internal to computing system 10, note that memory apparatus 10 may optionally be located external to computing system 10 (e.g., in a remote location) and connected to computing system 10 through a communication link (e.g., a network, the Internet, etc). Interface 7 comprises all devices related to interfacing user 8 to computing system 10. Interface 7 comprises all sensors used for monitoring user 8 vehicle operation functions as well as a monitor for presenting the feedback reports to user 8.

Vehicular feedback software application 18 controls all functions related to:
1. Generating profiles 27.
2. Analyzing vehicle operation functions.
3. Generating feedback reports 30.
4. Analyzing user/operator functions.

The following description illustrates a vehicle feedback report generation process. Upon entering vehicle 5 (e.g., a car, a truck, a motorcycle, a construction vehicle, etc.), user 8 (i.e., the operator of vehicle 8) is identified via direct input or via RFID, Bluetooth or any device capable of radiating a signal which may be identified by computing system 10. If user 8 is not identified or would like to generate a new profile, a menu on interface 7 presents an option to generate a profile.

Table 1 illustrates an example of a list of profiles.

TABLE 1

| Profile Name | Program | Description | Usage |
|---|---|---|---|
| In Town | Drive and Listen to In-Town Radio | Stop and Start Pattern to be detected; select radio stations | Default; normal in-town driving |
| Highway | Drive and Scan for Best Signal | Detect Highway Pattern; select/deselect radio stations | Default; normal highway pattern |
| Mix | Drive | Combination of In Town and Highway; detect Pattern | Default; EPA pattern by default |
| Tom | Drive | Highway pattern modified for higher speed limit | Fuel Check ON; Speed Check ON; Temperature ON |
| Dick | Drive | In Town pattern modified for types of monitoring | Fuel efficiency OFF; Brake monitoring ON; Temperature ON |

If a profile doesn't exist (i.e., is not listed), then user 8 is prompted to generate a new profile comprising the following attributes:
1. Profile name
2. Profile description
3. Usage
4. Username Usage attribute may comprise the following entries:

| | |
|---|---|
| 1. User name | |
| 2. Type of user | Advanced, Intermediate, Beginner |
| 3. Suggestion prompting | On/Off |
| 4. Fuel check | On/Off |
| 5. Brake check | On/Off |
| 6. Battery check | On/Off |
| 7. Logging | On/Off |
| 8. Speed check | On/Off |
| 9. Radio monitor | On/Off |
| 10. Erratic Driving | On/Off |

The generated profile stores any selected information. User 8 may choose one of several pre-stored profiles or generate a unique one.

As user 8 operates vehicle 5, various sensors monitor driver activities. Vehicular feedback software application 18 may either store input based on GPS and other onboard monitoring for later uploading/analysis or to provide feedback.

Vehicular feedback software application 18 may be used to monitor the following attributes associated with vehicle 5.
1. Fuel efficiency may be monitored by monitoring how quickly user 8 removed his/her foot from an accelerator for vehicle 5. The aforementioned monitoring process is executed when a sensor within interface 7 detects a second vehicle ahead slowing down or stopped. Additionally, speeding up inclines or excessive breaking on declines could be detected by monitoring how often a cruise control is engaged or disengaged. A speed for vehicle 5 could be monitored in different weather scenarios to indicate excessive speed or highway/expressway driving could be monitored for either excessive or slow speeds.
2. Brake monitoring could be monitored in terms of how hard the brakes are applied, how often anti-locking brakes are engaged, etc. The brake monitoring data could be compared to various norms to indicate general safe/unsafe driving practices.
3. Other characteristics as indicated in the profile could be monitored. In response, feedback could be generated in real time so that user 8 is advised to take a foot off of the accelerator (based on narrowing gap between vehicle in front of this vehicle) or conversely by sensing an allowable speed limit and the speed of vehicle 8 and a gap between vehicles. A message for user 8 may be generated indicating that user 8 should either speed up or change to a slower lane.

The following description (steps) illustrates an example of implementation for monitoring vehicle operation functions for a user 8 and providing feedback associated with the vehicle operation functions:

Janice, (i.e., a user) enters her vehicle (e.g., vehicle 5) and inserts the ignition key. If the vehicle cannot recognize her, Janice is prompted to select a saved profile or generate a new profile. Janice, selects her profile and indicates that she is going to execute highway driving. She selects vehicular feedback software application 18 and is prompted whether or not previous road trips, statistics, and history should be loaded for processing during her present use of the vehicle.

Janice selects from her profile, a previous road trip that she has saved (e.g., a trip to mom's house). This entry describes her as an intermediate driver, monitor speed, monitor's fuel, enables a GPS (global positioning satellite), enables a radio scan (e.g., with music stations only), and enables erratic driver behavior. Additionally, Janice requests for profiling analysis to be turned on.

Janice now drives to a gasoline station to full her fuel tank. Janis stops the vehicle. After filling the fuel tank, Janice restarts the vehicle and computing system 10 confirms that the trip to moms is enabled. Janice confirms the profile and selects a start now entry. Computing system 10 performs a status check on subsystems, predicts fuel efficiency, predicts estimated time of arrival based upon history, and informs Janice.

As the trip to mom's house is being performed, computing system 10 monitors speed, fuel efficiency, and other subsystems.
1. If any slowdowns are encountered (e.g., stop/start based upon an accident), computing system 10 periodically updates an estimated time of arrival (ETA).
2. If radio scanning is enabled and the radio is on, computing system 10 monitors key words relevant to trip to mom (e.g., accident on the road she is traveling). The radio station is tuned and Janice may take an appropriate action. Computing system 10 may additionally recommend alternate routes to mom's house for Janice to consider.
3. If fuel becomes an issue (e.g., Advise when one third remains or Margin of Safety), the system advises Janice. In more advanced systems, upcoming gasoline stations can be located along the route.

Computing system 10 continues to monitor progress to mom's house. When Janice is in proximity of arriving at mom's house, computing system 10 confirms arrival, reports statistics, prompts if further assistance is needed, and begins a shutdown process. When Janice turns the car off, computing system 10 saves all information related to the travel. Later on, Janice may request a more thorough analysis (e.g., slow downs, diversions, sudden braking, sudden speedups or swerves, a sleep-like behavior, etc). Suggestions may be provided.

An option may be given such that any actions recommended could be cross referenced against existing web sites using a search engine.

Figure 2:
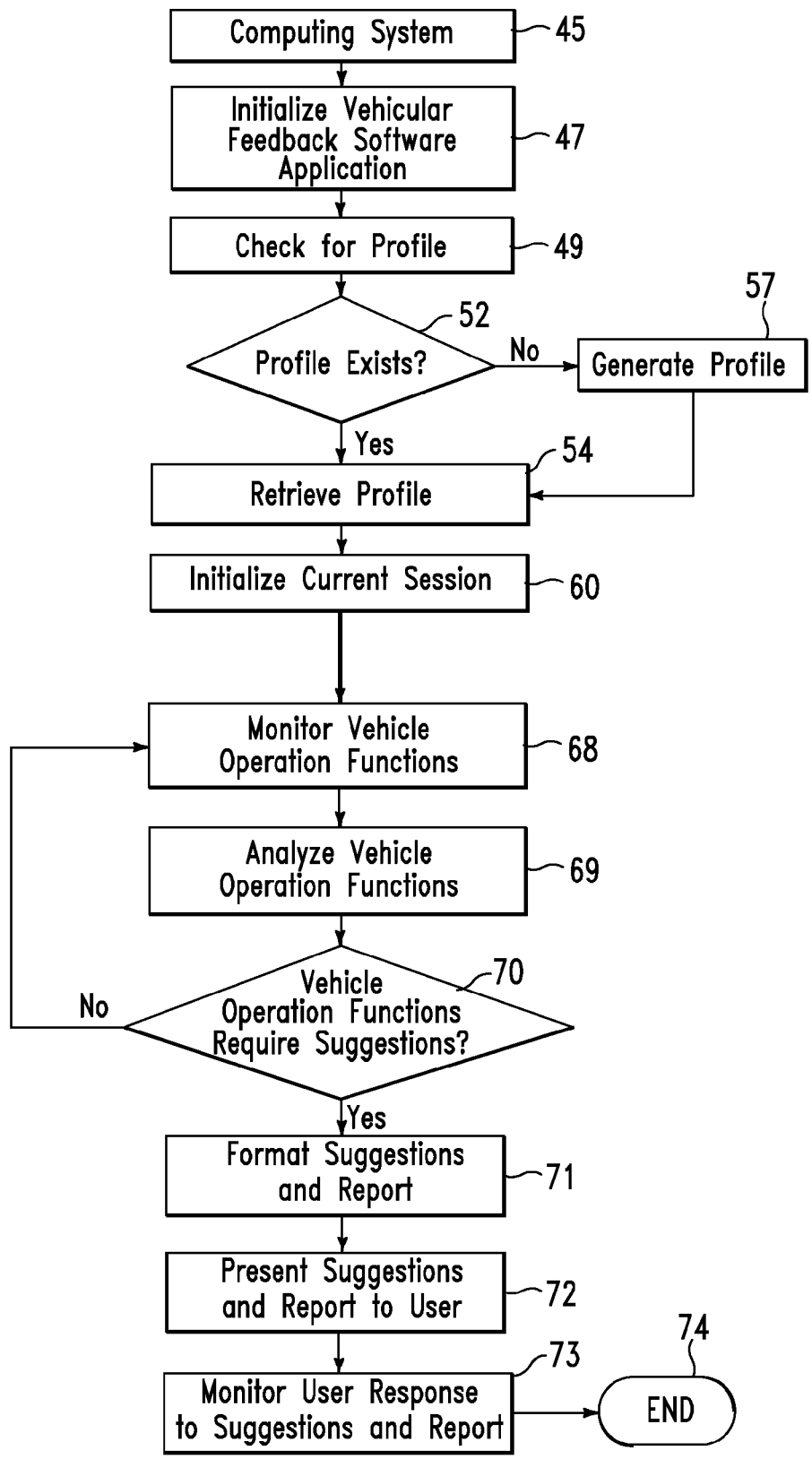
FIG. 2 illustrates a flowchart describing an example of an algorithm used by system of FIG. 1 for monitoring vehicle operation functions for the user and providing feedback associated with the vehicle operation functions, in accordance with embodiments of the present invention.

FIG. 2 illustrates a flowchart describing an example of an algorithm used by system 2 of FIG. 1 for monitoring vehicle operation functions for a user 8 and providing feedback associated with the vehicle operation functions, in accordance with embodiments of the present invention. In step 45, a user is identified by computing system 10. In step 47, computing system initializes vehicular feedback software application 18. In step 49, vehicular feedback software application 18 (in response to user request) checks memory system for profiles associated with the user. In step 52, it is determined if a requested profile is available.

If in step 52, it is determined that the requested profile is not available then in step 57 a profile generation process is performed as described with reference to FIG. 1, supra and step 54 is executed as described, supra. The profile may be stored in memory system 14.

If in step 52, it is determined that the requested profile is available then in step 54 the requested profile is retrieved from memory system 14. In step 60, a current feedback session is initialized for the user. In step 68, vehicular feedback software application 18 monitors vehicle operation functions and provides feedback associated with the vehicle operation functions as described with reference to FIG. 1. In step 69, vehicle operation functions are analyzed. The vehicle operation functions are analyzed with respect to the user profile retrieved in step 54, a user profile for another user, past user input, etc. In step 70, it is determined if the vehicle operation functions in step 69 requires suggestions for performing vehicle operation functions efficiently.

If in step 70, it is determined that the vehicle operation functions analyzed in step 69 does not require suggestions for performing vehicle operation functions efficiently then step 68 is repeated.

If in step 70, it is determined that vehicle operation functions analyzed in step 69 does require suggestions for performing vehicle operation functions efficiently then in step 71 suggestions are formatted and a feedback report is generated. In step 72, the feedback report is presented to the user. In step 73, feedback software application monitors user response to the suggestions and the process terminates in step 74.

Figure 3:
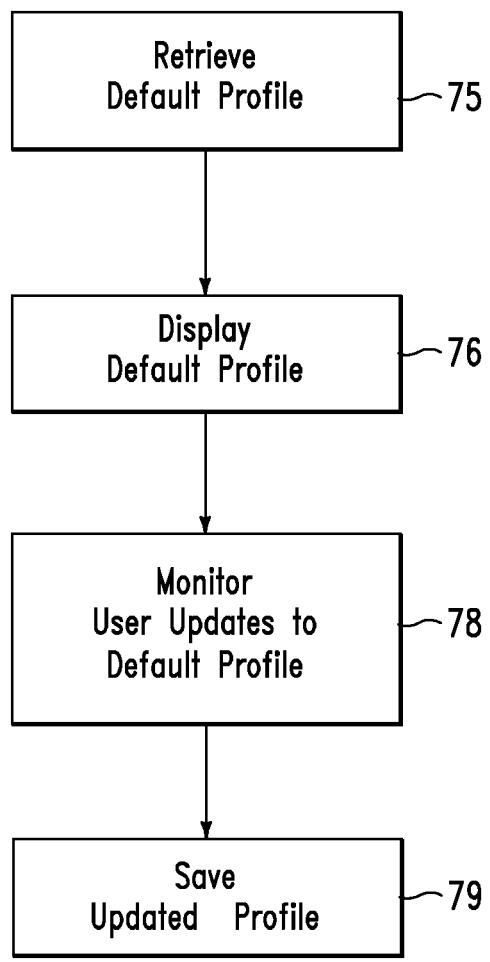
FIG. 3 illustrates a flowchart illustrating an algorithm for generating a profile, in accordance with embodiments of the present invention.

FIG. 3 illustrates a flowchart detailing step 57 of FIG. 2 for generating a profile, in accordance with embodiments of the present invention. In step 75, a default (i.e., generic) profile is retrieved. The generic profile may comprise a profile template. In step 76, the default (i.e., generic) profile is presented to the user. In step 78, the user updates the profile and vehicular feedback software application 18 monitors the updates to the profile. In step 79, the profile is named and saved.

Figure 4:
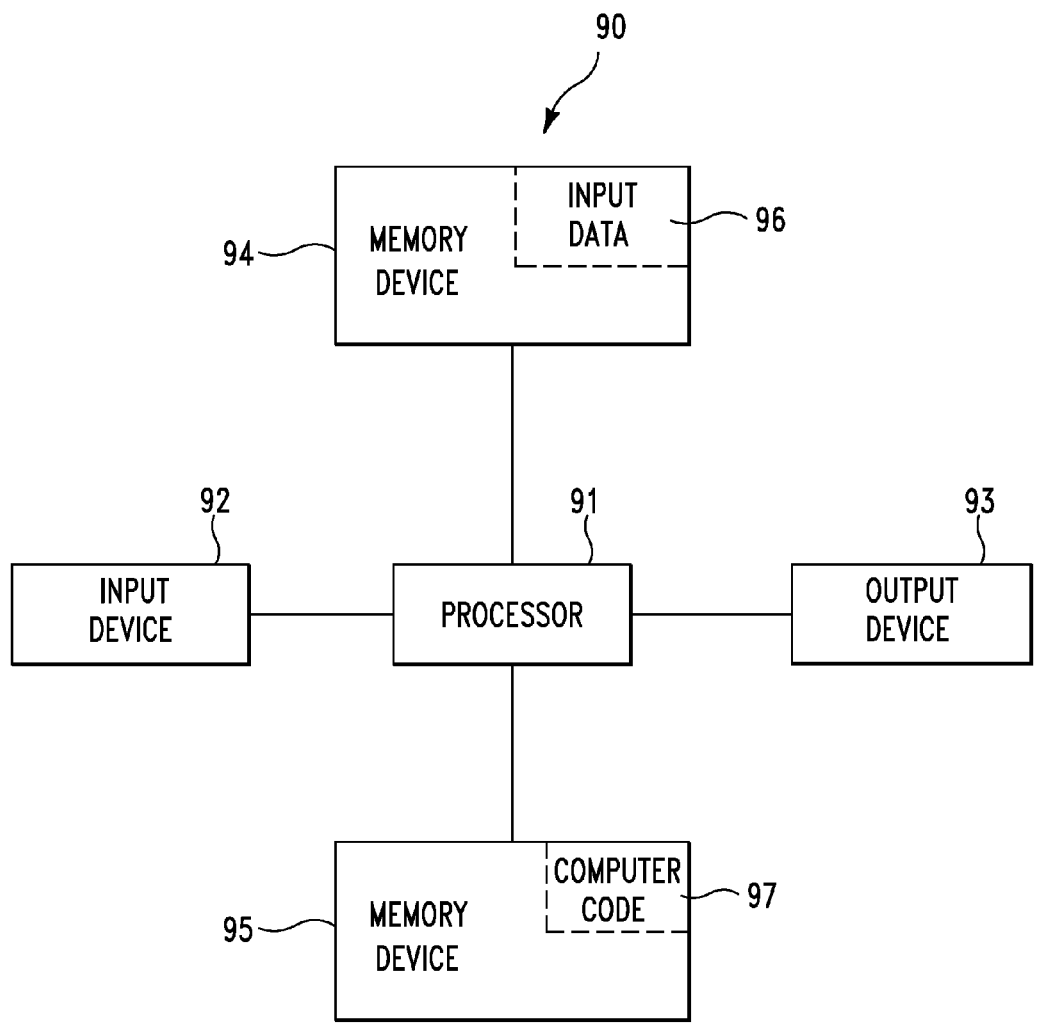
FIG. 4 illustrates a computer apparatus used for monitoring vehicle operation functions for the user and providing feedback associated with the vehicle operation functions, in accordance with embodiments of the present invention.

FIG. 4 illustrates a computer apparatus 90 (e.g., computing system 10 of FIG. 1) used for monitoring vehicle operation functions for a user 8 and providing feedback associated with the vehicle operation functions, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-3) for monitoring vehicle operation functions for a user 8 and providing feedback associated with the vehicle operation functions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithms of FIGS. 2-3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to monitor vehicle operation functions for a user 8 and provide feedback associated with the vehicle operation functions. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for monitoring vehicle operation functions for a user 8 and providing feedback associated with the vehicle operation functions. In another embodiment, the invention provides a business method that performs the process steps of the invention on a subscription, advertising, and/or fee basis. That is, a service provider, such as a Solution Integrator, could offer to monitor vehicle operation functions for a user 8 and provide feedback associated with the vehicle operation functions. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A feedback method comprising:
identifying, by a computing system comprising a computer processor electrically connected to a vehicle, a first user, wherein said computing system comprises a memory system, wherein said memory system comprises a first plurality of profiles, a table describing said first plurality of profiles and a vehicular feedback software application, wherein said table comprises a profile name, a program description, a driving pattern description, and a usage description for each profile of said plurality of profiles, and wherein said first plurality of profiles com- prises data associated with various vehicle operation functions that have been previously executed by said first user;

enabling, by said computing system, said vehicular feedback software application for said first user;

determining, by said computing system executing said vehicular feedback software application, that previous road trips, statistics, and history should be loaded for processing during present use of said vehicle;

retrieving, by said computing system from said memory system in response to a user selection from said table, a first profile of said first plurality of profiles, said first profile associated with said first user, said destination, and a first group of vehicle operation functions currently being executed by said first user with respect to said vehicle, said first profile comprising usage attribute on/off selections;

receiving, by said computing system from said first user, a first selection from said first profile, said first selection indicating a previous road trip to a destination for said first user, said selection comprising data describing said user as an intermediate driver, said data indicating instructions for: monitoring speed, monitoring fuel usage, enabling a GPS signal, and enabling a radio scan of only music stations for monitoring keywords associated with accidents during travel to said destination;

receiving, by said computing system from said first user, an indication of a road type for driving to said destination;

receiving, by said computing system from said first user, a selection for said destination for said first user;

generating, by said computing system, an estimated time of arrival for said destination;

presenting, by said computing system to said first user, said user profile;

receiving, by said computing system from said first user, on or off selections for said usage attribute on/off selections;

monitoring, by said feedback software application based on said on or off selections, said first group of vehicle operation functions, wherein said monitoring comprises:
  determining any slowdowns encountered based an accident and in response, periodically updating an estimated time of arrival;
  monitoring relevant keywords of said radio scan of only music stations and recommending alternate routes to said destination;
  monitoring fuel usage such that when one third of available fuel remains the first user is advised and upcoming gasoline stations are located;

additionally monitoring by said feedback software application, time differences describing a difference value between an acceleration rate and a braking rate with respect to said first user and said vehicle;

analyzing, by said feedback software application based on said monitoring, said first group of vehicle operation functions and said time differences with respect to said first profile of said first plurality of profiles;

generating in response to said analyzing said first group of vehicle operation functions and said additionally monitoring said time differences with respect to said first profile of said first plurality of profiles, by said computer processor executing said feedback software application, a first analysis report comprising results of said analyzing said first group of vehicle operation functions with respect to said first profile of said first plurality of profiles, wherein said first analysis report comprises: recommendations for said first user;

generating, by said computing system in response to said analyzing, an updated estimated time of arrival for said destination;

automatically tuning, by said computing system in response to said analyzing and a radio monitor selection, a radio in said vehicle to a specified music station indicating current road conditions for a route of travel to said destination;

presenting, by said computing system to said first user, said first analysis report and said updated estimated time of arrival; and monitoring, by said computing system, a response to said first analysis report from said first user.

2. The method of claim 1, wherein said method further comprises:

disabling, by said computing system, said vehicular feedback software application for said first user;

identifying, by said computing system, a second user, wherein said memory system comprises a second plurality of profiles, and wherein each profile of said second plurality of profiles is associated with various vehicle operation functions that have been previously executed by said second user;

enabling, by said computing system, said vehicular feedback software application for said second user;

retrieving, by said computing system from said memory system, a first profile of said second plurality of profiles, said first profile of said second plurality of profiles associated with said second user and a second group of vehicle operation functions currently being executed by said second user with respect to said vehicle;

monitoring, by said feedback software application, said second group of vehicle operation functions;

analyzing, by said feedback software application, said second group of vehicle operation functions with respect to said first profile of said second plurality of profiles;

generating in response to said analyzing said second group of vehicle operation functions with respect to said first profile of said second plurality of profiles, by said feedback software application, a second analysis report comprising results of said analyzing said second group of vehicle operation functions with respect to said first profile of said second plurality of profiles; and presenting, by said computing system to said second user, said second analysis report monitoring, by said computing system, a response to said second analysis report from said second user.

3. The method of claim 2, further comprising:

analyzing, by said feedback software application, said second group of vehicle operation functions with respect to said first group of vehicle operation functions;

generating in response to said analyzing said second group of vehicle operation functions with respect to said first group of vehicle operation functions, by said feedback software application, a third analysis report comprising results of said analyzing said second group of vehicle operation functions with respect to said first group of vehicle operation functions;

presenting, by said computing system to said second user, said third analysis report; and monitoring, by said computing system, a response to said third analysis report from said second user.

4. The method of claim 1, wherein said computing system is located within said vehicle.

5. The method of claim 1, wherein said computing system is located external to said vehicle.

6. The method of claim 1, wherein said vehicle is selected from the group consisting of an automobile, a boat, a train, an airplane and a motorcycle.

7. The method of claim 1, wherein said first analysis report comprises suggestions for said first user, said suggestions comprising efficiency ideas for: performing said first group of vehicle operation functions.

8. A computing system comprising a computer processor coupled to a computer-readable memory unit, said memory unit comprising a first plurality of profiles, a vehicular feedback software application, a table describing said first plurality of profiles, and instructions that when executed by the processor implement a feedback method, wherein said table comprises a profile name, a program description, a driving pattern description, and a usage description for each profile of said plurality of profiles, wherein each said profile of said first plurality of profiles comprises data associated with various vehicle operation functions that have been previously executed by a first user, said method comprising:

identifying, by said computing system, said first user, wherein said computing system is electrically connected to a vehicle;

enabling, by said computing system, said vehicular feedback software application for said first user;

determining, by said computing system executing said vehicular feedback software application, that previous road trips, statistics, and history should be loaded for processing during present use of said vehicle;

retrieving, by said computing system from said memory unit in response to a user selection from said table, a first profile of said first plurality of profiles, said first profile associated with said first user, said destination, and a first group of vehicle operation functions currently being executed by said first user with respect to said vehicle, said first profile comprising usage attribute on/off selections;

receiving, by said computing system from said first user, a first selection from said first profile, said first selection indicating a previous road trip to a destination for said first user, said selection comprising data describing said user as an intermediate driver, said data indicating instructions for: monitoring speed, monitoring fuel usage, enabling a GPS signal, and enabling a radio scan of only music stations for monitoring keywords associated with accidents during travel to said destination;

receiving, by said computing system from said first user, an indication of a road type for driving to said destination;

receiving, by said computing system from said first user, a selection for said destination for said first user;

generating, by said computing system, an estimated time of arrival for said destination;

presenting, by said computing system to said first user, said user profile;

receiving, by said computing system from said first user, on or off selections for said usage attribute on/off selections;

monitoring, by said feedback software application based on said on or off selections, said first group of vehicle operation functions, wherein said monitoring comprises:

determining any slowdowns encountered based an accident and in response, periodically updating an estimated time of arrival;

monitoring relevant keywords of said radio scan of only music stations and recommending alternate routes to said destination;

monitoring fuel usage such that when one third of available fuel remains the first user is advised and upcoming gasoline stations are located;

additionally monitoring by said feedback software application, time differences describing a difference value between an acceleration rate and a braking rate with respect to said first user and said vehicle;

analyzing, by said feedback software application based on said monitoring, said first group of vehicle operation functions and said time differences with respect to said first profile of said first plurality of profiles;

generating in response to said analyzing said first group of vehicle operation functions and said additionally monitoring said time differences with respect to said first profile of said first plurality of profiles, by said computer processor executing said feedback software application, a first analysis report comprising results of said analyzing said first group of vehicle operation functions with respect to said first profile of said first plurality of profiles, wherein said first analysis report comprises: recommendations for said first user;

generating, by said computing system in response to said analyzing, an updated estimated time of arrival for said destination;

automatically tuning, by said computing system in response to said analyzing and a radio monitor selection, a radio in said vehicle to a specified music station indicating current road conditions for a route of travel to said destination;

presenting, by said computing system to said first user, said first analysis report and said updated estimated time of arrival; and monitoring, by said computing system, a response to said first analysis report from said first user.

9. The computing system of claim 8, wherein said method further comprises:

disabling, by said computing system, said vehicular feedback software application for said first user;

identifying, by said computing system, a second user, wherein said computer-readable memory unit comprises a second plurality of profiles, and wherein each profile of said second plurality of profiles is associated with various vehicle operation functions that have been previously executed by said second user;

enabling, by said computing system, said vehicular feedback software application for said second user;

retrieving, by said computing system from said memory system, a first profile of said second plurality of profiles, said first profile of said second plurality of profiles associated with said second user and a second group of vehicle operation functions currently being executed by said second user with respect to said vehicle;

monitoring, by said feedback software application, said second group of vehicle operation functions;

analyzing, by said feedback software application, said second group of vehicle operation functions with respect to said first profile of said second plurality of profiles;

generating in response to said analyzing said second group of vehicle operation functions with respect to said first profile of said second plurality of profiles, by said feedback software application, a second analysis report comprising results of said analyzing said second group of vehicle operation functions with respect to said first profile of said second plurality of profiles; and presenting, by said computing system to said second user, said second analysis report
monitoring, by said computing system, a response to said second analysis report from said second user.

10. The computing system of claim 9, wherein said method further comprises:
analyzing, by said feedback software application, said second group of vehicle operation functions with respect to said first group of vehicle operation functions;
generating in response to said analyzing said second group of vehicle operation functions with respect to said first group of vehicle operation functions, by said feedback software application, a third analysis report comprising results of said analyzing said second group of vehicle operation functions with respect to said first group of vehicle operation functions;
presenting, by said computing system to said second user, said third analysis report; and
monitoring, by said computing system, a response to said third analysis report from said second user.

11. The computing system of claim 8, wherein said computing system is located within said vehicle.

12. The computing system of claim 8, wherein said computing system is located external to said vehicle.

13. The computing system of claim 8, wherein said vehicle is selected from the group consisting of an automobile, a boat, a train, an airplane and a motorcycle.

14. The computing system of claim 8, wherein said first analysis report comprises suggestions for said first user, said suggestions comprising efficiency ideas for: performing said first group of vehicle operation functions.

15. A computer program product, comprising a computer readable storage device storing a computer readable program code, said computer readable program code comprising an algorithm that when executed by a computer processor of a computing system implements a feedback method within a computing system, said method comprising:
identifying, by said computing system, a first user, wherein said computing system is electrically connected to a vehicle, wherein said computer readable storage device comprises a first plurality of profiles, a table describing said first plurality of profiles, and a vehicular feedback software application, wherein said table comprises a profile name, a program description, a driving pattern description, and a usage description for each profile of said plurality of profiles, and wherein said first plurality of profiles comprises data associated with various vehicle operation functions that have been previously executed by said first user;
enabling, by said computing system, said vehicular feedback software application for said first user;
determining, by said computing system executing said vehicular feedback software application, that previous road trips, statistics, and history should be loaded for processing during present use of said vehicle;
retrieving, by said computing system from said storage device in response to a user selection from said table, a first profile of said first plurality of profiles, said first profile associated with said first user, said destination, and a first group of vehicle operation functions currently being executed by said first user with respect to said vehicle, said first profile comprising usage attribute on/off selections;
receiving, by said computing system from said first user, a first selection from said first profile, said first selection indicating a previous road trip to a destination for said first user, said selection comprising data describing said user as an intermediate driver, said data indicating instructions for: monitoring speed, monitoring fuel usage, enabling a GPS signal, and enabling a radio scan of only music stations for monitoring keywords associated with accidents during travel to said destination;
receiving, by said computing system from said first user, an indication of a road type for driving to said destination;
receiving, by said computing system from said first user, a selection for said destination for said first user;
generating, by said computing system, an estimated time of arrival for said destination;
presenting, by said computing system to said first user, said user profile;
receiving, by said computing system from said first user, on or off selections for said usage attribute on/off selections;
monitoring, by said feedback software application based on said on or off selections, said first group of vehicle operation functions, wherein said monitoring comprises:
determining any slowdowns encountered based an accident and in response, periodically updating an estimated time of arrival;
monitoring relevant keywords of said radio scan of only music stations and recommending alternate routes to said destination;
monitoring fuel usage such that when one third of available fuel remains the first user is advised and upcoming gasoline stations are located;
additionally monitoring by said feedback software application, time differences describing a difference value between an acceleration rate and a braking rate with respect to said first user and said vehicle;
analyzing, by said feedback software application based on said monitoring, said first group of vehicle operation functions and said time differences with respect to said first profile of said first plurality of profiles;
generating in response to said analyzing said first group of vehicle operation functions and said additionally monitoring said time differences with respect to said first profile of said first plurality of profiles, by said computer processor executing said feedback software application, a first analysis report comprising results of said analyzing said first group of vehicle operation functions with respect to said first profile of said first plurality of profiles, wherein said first analysis report comprises: recommendations for said first user;
generating, by said computing system in response to said analyzing, an updated estimated time of arrival for said destination;
automatically tuning, by said computing system in response to said analyzing and a radio monitor selection, a radio in said vehicle to a specified music station indicating current road conditions for a route of travel to said destination;
presenting, by said computing system to said first user, said first analysis report and said updated estimated time of arrival; and
monitoring, by said computing system, a response to said first analysis report from said first user.

16. The computer program product of claim 15, wherein said method further comprises:
disabling, by said computing system, said vehicular feedback software application for said first user;
identifying, by said computing system, a second user, wherein said computer-readable medium comprises a second plurality of profiles, and wherein each profile of said second plurality of profiles is associated with various vehicle operation functions that have been previously executed by said second user;

enabling, by said computing system, said vehicular feedback software application for said second user;

retrieving, by said computing system from said memory system, a first profile of said second plurality of profiles, said first profile of said second plurality of profiles associated with said second user and a second group of vehicle operation functions currently being executed by said second user with respect to said vehicle;

monitoring, by said feedback software application, said second group of vehicle operation functions;

analyzing, by said feedback software application, said second group of vehicle operation functions with respect to said first profile of said second plurality of profiles;

generating in response to said analyzing said second group of vehicle operation functions with respect to said first profile of said second plurality of profiles, by said feedback software application, a second analysis report comprising results of said analyzing said second group of vehicle operation functions with respect to said first profile of said second plurality of profiles; and presenting, by said computing system to said second user, said second analysis report monitoring, by said computing system, a response to said second analysis report from said second user.

17. The computer program product of claim 16, wherein said method further comprises:

analyzing, by said feedback software application, said second group of vehicle operation functions with respect to said first group of vehicle operation functions;

generating in response to said analyzing said second group of vehicle operation functions with respect to said first group of vehicle operation functions, by said feedback software application, a third analysis report comprising results of said analyzing said second group of vehicle operation functions with respect to said first group of vehicle operation functions;

presenting, by said computing system to said second user, said third analysis report; and monitoring, by said computing system, a response to said third analysis report from said second user.

18. The computer program product of claim 15, wherein said computing system is located within said vehicle.

19. The computer program product of claim 15, wherein said computing system is located external to said vehicle.

20. The computer program product of claim 15, wherein said vehicle is selected from the group consisting of an automobile, a boat, a train, an airplane and a motorcycle.

21. The computer program product of claim 15, wherein said first analysis report comprises suggestions for said first user, said suggestions comprising efficiency ideas for: performing said first group of vehicle operation functions.

22. A process for supporting computer infrastructure, said process comprising providing at least one support service for at least one of creating, integrating, hosting, maintaining, and deploying computer-readable code in a computing system comprising a computer processor, wherein the code in combination with the computing system is capable of performing a feedback method, said method comprising:

identifying, by said computing system, a first user, wherein said computing system is electrically connected to a vehicle, wherein said computing system comprises a memory system, wherein said memory system comprises a first plurality of profiles, a table describing said first plurality of profiles, and a vehicular feedback software application, wherein said table comprises a profile name, a program description, a driving pattern description, and a usage description for each profile of said plurality of profiles, and wherein said first plurality of profiles comprises data associated with various vehicle operation functions that have been previously executed by said first user;

enabling, by said computing system, said vehicular feedback software application for said first user;

determining, by said computing system executing said vehicular feedback software application, that previous road trips, statistics, and history should be loaded for processing during present use of said vehicle;

retrieving, by said computing system from said memory system in response to a user selection from said table, a first profile of said first plurality of profiles, said first profile associated with said first user, said destination, and a first group of vehicle operation functions currently being executed by said first user with respect to said vehicle, said first profile comprising usage attribute on/off selections;

receiving, by said computing system from said first user, a first selection from said first profile, said first selection indicating a previous road trip to a destination for said first user, said selection comprising data describing said user as an intermediate driver, said data indicating instructions for: monitoring speed, monitoring fuel usage, enabling a GAS signal, and enabling a radio scan of only music stations for monitoring keywords associated with accidents during travel to said destination;

receiving, by said computing system from said first user, an indication of a road type for driving to said destination;

receiving, by said computing system from said first user, a selection for said destination for said first user;

generating, by said computing system, an estimated time of arrival for said destination;

presenting, by said computing system to said first user, said user profile;

receiving, by said computing system from said first user, on or off selections for said usage attribute on/off selections;

monitoring, by said feedback software application based on said on or off selections, said first group of vehicle operation functions, wherein said monitoring comprises:

determining any slowdowns encountered based an accident and in response, periodically updating an estimated time of arrival;

monitoring relevant keywords of said radio scan of only music stations and recommending alternate routes to said destination;

monitoring fuel usage such that when one third of available fuel remains the first user is advised and upcoming gasoline stations are located;

additionally monitoring by said feedback software application, time differences describing a difference value between an acceleration rate and a braking rate with respect to said first user and said vehicle;

analyzing, by said feedback software application based on said monitoring, said first group of vehicle operation functions and said time differences with respect to said first profile of said first plurality of profiles;

generating in response to said analyzing said first group of vehicle operation functions and said additionally monitoring said time differences with respect to said first profile of said first plurality of profiles, by said computer processor executing said feedback software application, a first analysis report comprising results of said analyzing said first group of vehicle operation functions with respect to said first profile of said first plurality of profiles, wherein said first analysis report comprises: recommendations for said first user;

generating, by said computing system in response to said analyzing, an updated estimated time of arrival for said destination;

automatically tuning, by said computing system in response to said analyzing and a radio monitor selection, a radio in said vehicle to a specified music station indicating current road conditions for a route of travel to said destination;

presenting, by said computing system to said first user, said first analysis report and said updated estimated time of arrival; and monitoring, by said computing system, a response to said first analysis report from said first user.

23. The process of claim 22, wherein said method further comprises:

disabling, by said computing system, said vehicular feedback software application for said first user;

identifying, by said computing system, a second user, wherein said memory system comprises a second plurality of profiles, and wherein each profile of said second plurality of profiles is associated with various vehicle operation functions that have been previously executed by said second user;

enabling, by said computing system, said vehicular feedback software application for said second user;

retrieving, by said computing system from said memory system, a first profile of said second plurality of profiles, said first profile of said second plurality of profiles associated with said second user and a second group of vehicle operation functions currently being executed by said second user with respect to said vehicle;

monitoring, by said feedback software application, said second group of vehicle operation functions;

analyzing, by said feedback software application, said second group of vehicle operation functions with respect to said first profile of said second plurality of profiles;

generating in response to said analyzing said second group of vehicle operation functions with respect to said first profile of said second plurality of profiles, by said feedback software application, a second analysis report comprising results of said analyzing said second group of vehicle operation functions with respect to said first profile of said second plurality of profiles; and presenting, by said computing system to said second user, said second analysis report monitoring, by said computing system, a response to said second analysis report from said second user.

24. The process of claim 23, wherein said method further comprises:

analyzing, by said feedback software application, said second group of vehicle operation functions with respect to said first group of vehicle operation functions;

generating in response to said analyzing said second group of vehicle operation functions with respect to said first group of vehicle operation functions, by said feedback software application, a third analysis report comprising results of said analyzing said second group of vehicle operation functions with respect to said first group of vehicle operation functions;

presenting, by said computing system to said second user, said third analysis report; and monitoring, by said computing system, a response to said third analysis report from said second user.

25. The process of claim 22, wherein said first analysis report comprises suggestions for said first user, said suggestions comprising efficiency ideas for: performing said first group of vehicle operation functions.

* * * * *